UNITED STATES PATENT OFFICE.

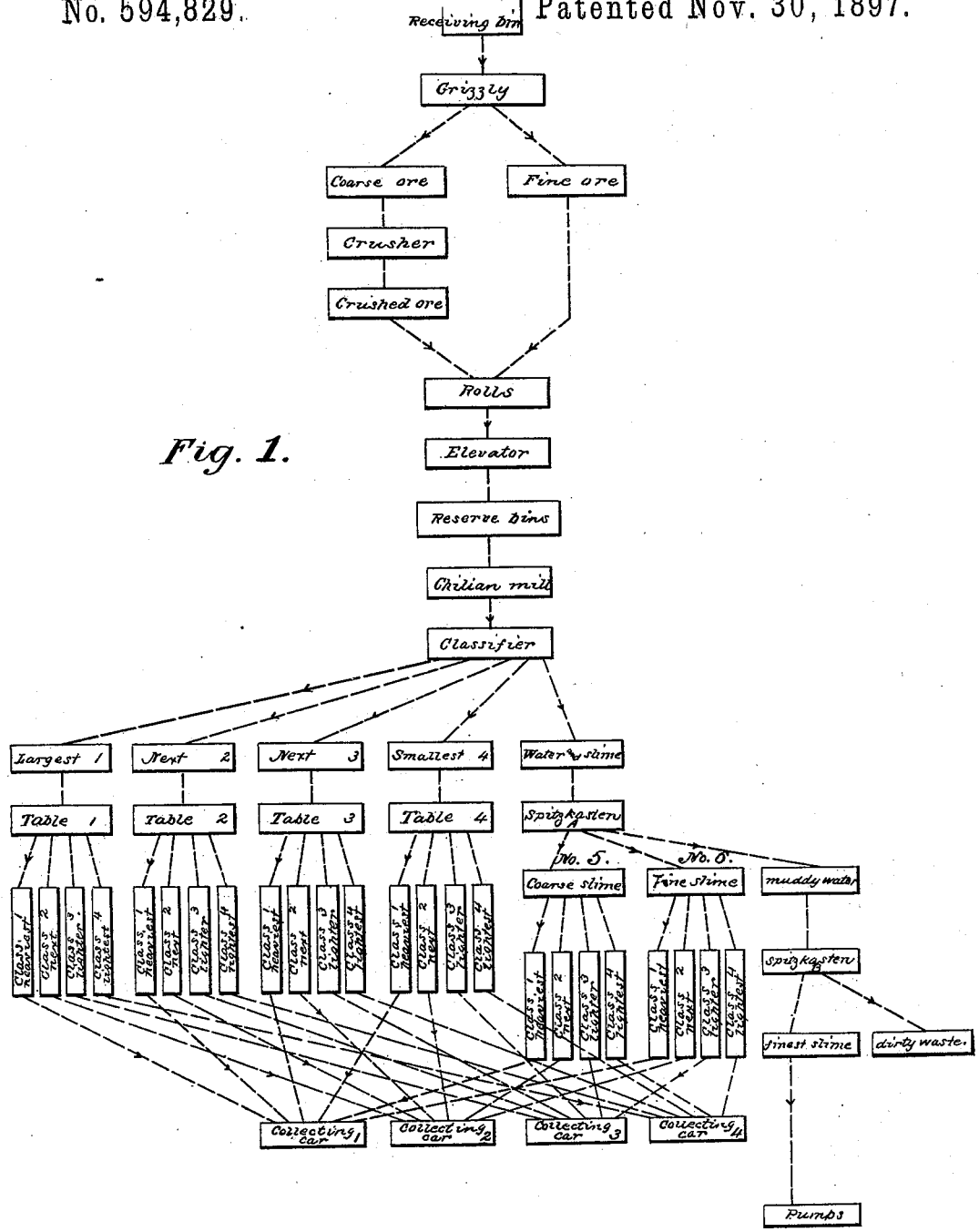

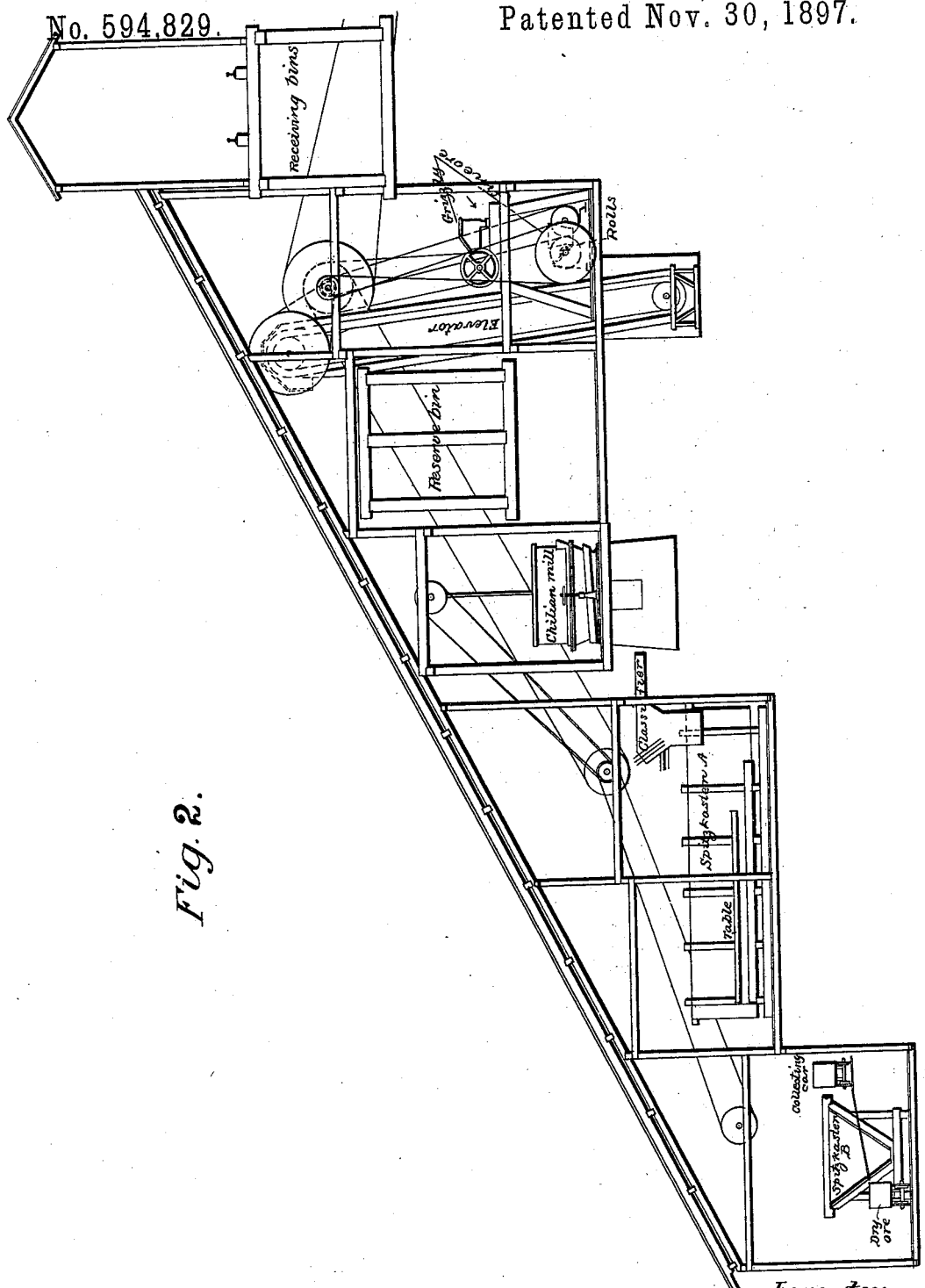

SAMUEL IRVING HALLETT, OF ASPEN, COLORADO, ASSIGNOR OF ONE-HALF TO D. M. HYMAN, OF CINCINNATI, OHIO.

PROCESS OF TREATING ZINC-LEAD OR OTHER ORES.

SPECIFICATION forming part of Letters Patent No. 594,829, dated November 30, 1897.

Application filed July 6, 1897. Serial No. 643,655. (No specimens.)

*To all whom it may concern:*

Be it known that I, SAMUEL IRVING HALLETT, a citizen of the United States, residing at Aspen, in the county of Pitkin and State of Colorado, have invented certain new and useful Improvements in Processes of Treating Zinc-Lead or other Ores; and I do hereby declare the following to be a full, clear, and exact description of the invention, such as will enable others skilled in the art to which it appertains to make and use the same.

This invention relates to processes for treating ores for the purpose of separating and recovering the valuable metals contained therein, but more particularly to the treatment of zinc-lead and other complex ores containing two or more metallic minerals for recovering the valuable products thereof.

The primary object of my invention is to provide a method of treating zinc-lead and other complex ores, so as to recover a greater percentage of the valuable products of such ores than is possible when treated according to common methods or such methods as have heretofore been proposed.

Various methods have heretofore been devised for treating rich ores, particularly those containing gold and silver, and other processes have been devised by which an imperfect separation of the more valuable metals contained in other ores has been effected; but the first-named processes for treating rich gold and silver ores are inapplicable to the particular class of ores for which my invention is especially designed, and no process has heretofore been devised, to my knowledge, for successfully treating zinc and lead ores and similar mineral-bearing substances in such manner that such ores can be commercially utilized or the separation of the valuable products thereof made practical or profitable, for the reason that the amount of valuable metal recovered in the treatment of these ores, except those which are of such high grade as to permit of their being worked at a profit, notwithstanding the great waste of the zinc or lead product which results from their treatment by methods in common use, is so small and the expense so great as to render their treatment unprofitable.

In previous processes the ore has been mechanically reduced to a greater or less extent for purposes of separation according to the specific gravities of the different particles, and in some processes the ore has been comminuted only to the extent of separating the metallic particles from their matrix, while in other processes the comminution has been carried to such an extent as to reduce the ore to an impalpable powder. Such methods are not commercially practical or profitable in the treatment of the particular class of ores to which my invention is especially adapted, and particularly low-grade ores, because of the loss resulting from excessive comminution on one hand and the incomplete separation resulting from too coarse reduction on the other hand, according to the method adopted, and consequently the impossibility of recovering a sufficient amount of the valuable products of the ore in treating ores of low grade to warrant the expense incident to their recovery. Moreover, in none of the methods of treatment heretofore practiced, to my knowledge, has there been observed any ascertained law governing the amount or extent of pulverization to which the ore is reduced, and the reduction has been largely, if not wholly, a matter of mere guesswork.

The gist of my invention resides in the discovery of a certain fixed law governing the reduction of the ore and is based upon the known normal crystalline formation of the minerals or metals to be separated, whereby the ore is reduced to a condition which will insure the complete separation of the zinc and lead or other valuable metal to be recovered in the subsequent processes of treating the crushed material according to methods in common use—for instance, by feeding the same to concentrating-tables well known in the art or on which the crushed ore is jarred toward the lower end of the table and washed by clear water on its road, the clear water washing the lighter ore toward the lower side of the table, which is inclined to the side away from the feed side, as well as slightly toward the discharge end. The heavier crystals, being harder to move, lag behind, at the same time being jarred or bumped in nearly a straight line toward the discharge end, which operation separates each mineral into different lines, whence each may be caught independently by suitable means and carried to driers to be dried.

My discovery in the art of dressing lead and zinc ores and their separation is based on the fact that if the ore is crushed as it comes in a state of union from the mine to the fineness equaling the size of the smallest crystal of galena a perfect separation of the crystals of the two minerals may be effected, and that their division subsequently into separate piles may be accomplished by known methods of applying the law of specific gravity. By following the same law any two or more ores or minerals may be separated in the same manner by crushing the crude ore to a size that will leave each crystal of any and all the ores independent and separate from the others. For example, in the separation of lead and zinc ores I crush the same to a fineness corresponding to the smallest crystal in the lead ore, which will release every crystal of lead into its own independent crystallization, in which state the crystals may be separated by utilizing the natural law of specific gravity, each crystal of each metal being deposited with its own kind and separate from the others by a suitable device or apparatus well known in the art for accomplishing this result. In the separation of sulfate of barium (baryta or heavy spar) and lead I crush the ore to the size of the smallest crystal of galena, thereby releasing the crystals of galena from the baryta, whereupon their division and separation may be accomplished by subsequent treatment according to common methods— that is, by the use of concentrators and well-known devices for applying the law of specific gravity. The discovery, in brief, is that as ore occurs in crystals it may be crushed or reduced to such condition as to leave each crystal independent of any other crystal, and in such condition the separation and recovery of the metal may be effected by utilizing the law of specific gravity. Thus having first ascertained by proper analysis the size of the smallest crystal of the mineral or metal having the greatest specific gravity of all of the metals the ore may contain the mass of ore under treatment is crushed or reduced to such state that its particles each approximate as closely as may be the size of such smallest crystal, and here the process of reduction ceases. In this condition the separation of the crushed material may be easily effected by subjecting it to the action of suitable screens or concentrating devices for separating and concentrating the metals to be recovered according to their specific gravities. The crushing of ores to the natural size of the finest constituent particles is not necessarily the same thing as reducing the ore to the size of the smallest crystal of the mineral or metal having the greatest specific gravity. The advantage in result peculiar to my method I conceive to be that the particles having the greatest specific gravity are at least as large as any of those of less specific gravity, and that consequently those which are smaller are also of less specific gravity, and thus the differences, for the purpose of separation, are exaggerated and accurate separation is facilitated.

When treating zinc and lead ores, the ore should be reduced to the fineness of the smallest crystal of lead ore, and in treating other ores containing three or more metals the ore should be reduced to the finest crystal of the mineral having the greatest specific gravity, in which state the separation of the valuable metals may be accomplished by the use of suitable screens or concentrating devices such as are now in use.

In the accompanying drawings, in which I have illustrated, diagrammatically, a suitable plant or combination of apparatus and machinery for practicing my invention, Figure 1 is a diagrammatic representation of a plant for reducing, separating, and concentrating the crushed ore according to the gravity of its particles, showing the various steps in the treatment thereof from the initial to the final step; and Fig. 2 is a diagrammatic side elevation of the reducing and concentrating mechanisms and apparatus shown in Fig. 1. The specific mechanisms shown in the diagrams may be of any well-known construction, such as will be readily understood by those skilled in the art, so that a specific description thereof is not deemed necessary herein.

The several machines and apparatus being arranged and adapted to carry out the process of reduction and separation, the ore is brought by any suitable means, as by railway-track in cars with self-dumping arrangement, immediately over the bins marked "Receiving-bins," is dumped into these bins, and fed into a crusher with a movable feeder having a grizzly underneath to take out the finest of the ore, the finest of the ore passing underneath the crusher, joining the stream coming through the crusher, which is fed by the feeder, the crusher breaking the larger of the coarser ores to a size of one inch in diameter, whence the combined stream is fed to the rolls, which crush to one-eighth to one-half inch in diameter. The ore is then elevated to a bin holding a day's run, marked "Reserve-bin," from which bin it is fed to three (more or less) Chilian mills by means of suitable mechanical feeders, all this process being dry. As it is fed to the Chilian mills water is added and it is crushed to the desired fineness and discharged through screens in the mill, which screens are part of the mill, but removable and adjustable, thence passing from the Chilian mills to classifiers marked "Classifiers," which sort the ore in ascending currents of water, the largest sizes passing to table marked "No. 1," the next size passing to table marked "No. 2," the next size passing to table marked "No. 3," and the next size passing to table marked "No. 4," thus disposing of the coarser ore. The dirty water and fine slimes that overflow from the classifier or size-sorter pass to a spitzkasten, marked "A," the products of the first compartment of which pass to table marked "No. 5," while the products of the remaining three compartments pass to table marked "No. 6."

The dirty water from the whole mill may be collected and run to a spitzkasten marked "B," settling the mineral contained in the waste water, so that any of the lighter minerals having but slight specific gravity may be collected and discharged to a pump and pumped to a pond or other dressing device for further use, if it should be desirable to utilize the same.

The mill or mechanical devices, machinery, and apparatus for treating the ore are preferably arranged in duplicate below the reserve bin or bins, so that different ores may be run at the same time or in order that the mill may run at half capacity and a breakdown may not require the stoppage of the entire plant.

The diagrammatic view Fig. 1 shows the machinery employed on one side only, the machinery and process on the other side below the reserve-bins being identical with that shown, so that a description or illustration of the machinery at the other side of the mill is not deemed necessary.

The construction and operation of one of the concentrating-tables such as I preferably employ in the practical use of my process is shown and described in my aforesaid pending application.

The ore which is fed into the ore-feed compartment or compartments and thence onto the table is separated into various classes according to its specific gravity, as indicated in the diagram Fig. 1, by the markings of the tables "Heaviest," "Next," "Lighter," "Lightest," &c., and the different classes are carried by the launders or conducted into suitable collecting or receiving cars, as indicated in the diagram, and from thence is discharged onto suitable driers, which remove the superfluous moisture, and is then scraped into cars, one of which is shown in Fig. 2 marked "Dry ore," whence it may be delivered to any place desired, being then in condition to be sent to further reduction-works or smelters.

While my invention is particularly applicable to the treatment of lead and zinc ores, it may be advantageously employed in the treatment of other ores, and hence I do not desire to be restricted to the treatment of the particular ores mentioned.

In reducing zinc-lead ores and similar metal-bearing substances it will be found that the valuable metals contained therein exist in crystalline form, the crystals varying in size from very minute particles to a size many times larger than one of these minute crystals or an aggregation of crystals, and hence in using the term "smallest crystal" in the following claims I do not wish to be understood as using that term selectively, so as to limit my invention to the selection of a single crystal that may exist in different ores more minute than all its fellows, but one of a series of the smallest crystals contained in the ore of approximately a uniform size.

I make no claim in this application to the mechanism or apparatus shown diagrammatically in the drawings filed herein merely for the purpose of illustrating a suitable arrangement of devices or apparatus for practicing my improved process.

Having thus fully described my invention, what I claim as new, and desire to secure by Letters Patent of the United States, is—

1. The method of treating zinc-lead or other complex ores containing two or more metallic minerals, for recovering the valuable metals contained therein, which consists in crushing the ore to the fineness of the smallest crystal of the metallic mineral having the greatest specific gravity, and then subjecting the crushed material to the action of suitable devices for separating and concentrating it according to the gravity of its particles, substantially as described.

2. The method of treating zinc-lead ore for recovering the valuable metals contained therein, which consists in crushing the ore to the fineness of the smallest crystal of galena, and then subjecting the crushed material to the action of suitable devices for separating and concentrating it according to the gravity of its particles, substantially as described.

In testimony whereof I affix my signature in presence of two witnesses.

SAMUEL IRVING HALLETT.

Witnesses:
ELIAS COHN,
JESSE J. MAY.

Correction in Letters Patent No. 594,829.

It is hereby certified that in Letters Patent No. 594,829, granted November 30, 1897, upon the application of Samuel Irving Hallett, of Aspen, Colorado, for an improvement in "Processes of Treating Zinc-Lead or Other Ores," an error appears in the printed specification requiring correction, as follows: In line 23, page 2, after the word "lead," the word *ore* should be inserted; and that the said Letters Patent should be read with this correction therein that the same may conform to the record of the case in the Patent Office.

Signed, countersigned, and sealed this 7th day of December, A. D., 1897.

[SEAL.]
                                                WEBSTER DAVIS,
*Assistant Secretary of the Interior.*

Countersigned:
    A. P. GREELEY,
        *Acting Commissioner of Patents.*